(12) United States Patent
Huang et al.

(10) Patent No.: US 11,108,676 B2
(45) Date of Patent: Aug. 31, 2021

(54) METHOD AND SYSTEM FOR DETECTING NETWORK QUALITY BASED ON A NETWORK FLUCTUATION MODEL

(71) Applicant: WANGSU SCIENCE & TECHNOLOGY CO., LTD., Shanghai (CN)

(72) Inventors: Meihong Huang, Shanghai (CN); Wenli Zheng, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 201 days.

(21) Appl. No.: 16/463,212

(22) PCT Filed: Jun. 14, 2018

(86) PCT No.: PCT/CN2018/091204
§ 371 (c)(1),
(2) Date: May 22, 2019

(87) PCT Pub. No.: WO2019/144560
PCT Pub. Date: Aug. 1, 2019

(65) Prior Publication Data
US 2021/0105201 A1    Apr. 8, 2021

(30) Foreign Application Priority Data
Jan. 25, 2018    (CN) .......................... 201810073673.8

(51) Int. Cl.
*H04L 12/26*    (2006.01)
*H04L 12/24*    (2006.01)

(52) U.S. Cl.
CPC .............. *H04L 43/50* (2013.01); *H04L 41/14* (2013.01); *H04L 41/142* (2013.01); *H04L 43/08* (2013.01); *H04L 43/0894* (2013.01); *H04L 43/14* (2013.01)

(58) Field of Classification Search
None
See application file for complete search history.

(56) References Cited

U.S. PATENT DOCUMENTS 8,600,425 B1 * 12/2013 Zang ................ H04W 52/0206
455/522
2002/0080726 A1    6/2002 Klassen et al.
(Continued)

FOREIGN PATENT DOCUMENTS

CN    101431473 A    5/2009
CN    103986621 A    8/2014
(Continued)

OTHER PUBLICATIONS

M.F. Scheffer, J.J.P. Beneke, J.S. Kunicki, Fuzzy Modeling and Prediction of Network Traffic Fluctuations COMSIG '94 (Year: 1994).*
(Continued)

*Primary Examiner* — Lance Leonard Barry (57) ABSTRACT

A method for detecting network quality includes: acquiring, by a data processing device, file download rates of a first node for files on a second node in a target time period within a pre-defined number of historical rate-collecting cycles; determining, by the data processing device, a plurality of network quality detection parameters from the first node to the second node in the target time period based on the file download rates, where the plurality of network quality
(Continued)

detection parameters include a regular network speed, a network speed fluctuation range, and a network speed lower limit; creating, by the data processing device, a network fluctuation model from the first node to the second node in the target time period based on the plurality of network quality detection parameters and respective pre-defined weights, and providing the network fluctuation model to a central scheduling device; and detecting, by the central scheduling device, a network quality from the first node to the second node in the target time period based on the network fluctuation model.

10 Claims, 2 Drawing Sheets

(56) References Cited

U.S. PATENT DOCUMENTS

| | | | |
|---|---|---|---|
| 2004/0024859 A1* | 2/2004 | Bloch | H04L 41/20 709/223 |
| 2008/0069152 A1* | 3/2008 | Hann | H04L 12/6418 370/506 |
| 2011/0310864 A1 | 12/2011 | Gage | |
| 2014/0215059 A1 | 7/2014 | Lezaun et al. | |

FOREIGN PATENT DOCUMENTS

| | | |
|---|---|---|
| CN | 104683182 A | 6/2015 |
| CN | 105050133 A | 11/2015 |
| CN | 105634784 A | 6/2016 |
| CN | 105847380 A | 8/2016 |
| CN | 105897838 A | 8/2016 |
| CN | 106534216 A | 3/2017 |
| CN | 107241771 A | 10/2017 |
| WO | 2015014295 A1 | 2/2015 |
| WO | WO2015014295 * | 2/2015 |

OTHER PUBLICATIONS

The China National Intelleectual Property Administration (CNIPA) The China Search Report for 201810073673.8 dated Aug. 16, 2019 3 Pages.
The China National Intelleectual Property Administration (CNIPA) The China Search Report for 201810073673.8 dated Jan. 13, 2020 3 Pages.
The World Intellectual Property Organization (WIPO) International Search Report and Written Opinion for PCT/CN2018/091204 dated Oct. 19, 2018 9 Pages.
The European Patent Office (EPO) The Extended European Search Report for 18893320.4 dated Dec. 13, 2019 9 Pages.
Han D D et al:"Fluctuation of the Download Network" arxiv.org, Cornell University Library, NY Oct. 31, 2007.

* cited by examiner

METHOD AND SYSTEM FOR DETECTING NETWORK QUALITY BASED ON A NETWORK FLUCTUATION MODEL

CROSS-REFERENCES TO RELATED APPLICATIONS

This application is a national phase entry under 35 U.S.C § 371 of International Application No. PCT/CN2018/091204 filed on Jun. 14, 2018, which claims priority of Chinese Patent Application No. 2018100736738, filed with the State Intellectual Property Office of P. R. China on Jan. 25, 2018, the entire contents of all of which are incorporated herein by reference.

FIELD OF DISCLOSURE

The present disclosure generally relates to the field of data transmission technology and, more particularly, relates to a method and system for detecting network quality.

BACKGROUND

With the continuous advancement of Internet technology, CDN (Content Delivery Network) services have also developed rapidly. The nodes in a CDN service cluster may store a large amount of data resources, and a user may obtain the data resources stored therein in a short period of time from a nearest node.

When a user needs to obtain data resources from a node through a terminal, the user may send a resource acquisition request to a network portal of the CDN service cluster via the terminal. After receiving the resource acquisition request, the CDN service cluster may use a network detection tool preset in the network portal to detect the network quality of the multiple transmission links between the network portal and the aforementioned nodes. The CDN service cluster may then choose a transmission link with the best network quality to transmit data between the terminal and a node.

In the process of implementing the present disclosure, the applicants have found that the existing technologies have at least the following problems:

The scale of a CDN service cluster continues to expand, the distribution of nodes is more and more extensive, and the number of network portals is also greatly increased. In order to ensure an effective detection of the network quality of transmission links, technical staff needs to deploy network detection tools at all network portals. Accordingly, the cost of detecting network quality is really high.

BRIEF SUMMARY OF THE DISCLOSURE

To solve the problems in the existing technologies, the embodiments of the present disclosure provide a method and system for detecting network quality. The technical solutions are as follows.

In one aspect, a method for detecting network quality is provided. The method includes:

acquiring, by a data processing device, file download rates of a first node for files on a second node in a target time period within a pre-defined number of historical rate-collecting cycles;

determining, by the data processing device, a plurality of network quality detection parameters from the first node to the second node in the target time period based on the file download rates, where the plurality of network quality detection parameters include a regular network speed, a network speed fluctuation range, and a network speed lower limit;

creating, by the data processing device, a network fluctuation model from the first node to the second node in the target time period based on the plurality of network quality detection parameters and respective pre-defined weights, and providing the network fluctuation model to a central scheduling device; and detecting, by the central scheduling device, a network quality from the first node to the second node in the target time period based on the network fluctuation model.

Optionally, acquiring, by the data processing device, the file download rates of the first node for the files on the second node in the target time period within the pre-defined number of historical rate-collecting cycles includes:

randomly selecting, by the central scheduling device, at least one device in a device group of each node, and sending a pre-defined test file to the at least one device of each node for storage;

periodically sending, by at least one device of the second node, a download trigger request of the test file to at least one device of the first node, to allow the at least one device of the first node to periodically download the test file from the at least one device of the second node; and acquiring, by the data processing device, file download rates of the at least one device of the first node in downloading the test file from the at least one device of the second node in the target time period within the pre-defined number of historical rate-collecting cycles.

Optionally, determining, by the data processing device, the plurality of network quality detection parameters from the first node to the second node in the target time period based on the file download rates includes:

respectively determining, by the data processing device, a median value, a interquartile range, and a minimum value of all the file download rates of the first node for the files on the second node in the target time period within the pre-defined number of historical rate-collecting cycles as the regular network speed, the network speed fluctuation range, and the network speed lower limit from the first node to the second node in the target time period.

Optionally, creating, by the data processing device, the network fluctuation model from the first node to the second node in the target time period based on the plurality of network quality detection parameters and the respective pre-defined weights further includes:

determining, by the data processing device, a maximum normal network speed, a maximum network speed fluctuation range, and a maximum network speed lower limit from any node to the second node in the target time period;

normalizing, by the data processing device, the plurality of network quality detection parameters based on the maximum normal network speed, the maximum network speed fluctuation range, and the maximum network speed lower limit; and creating, by the data processing device, the network fluctuation model from the first node to the second node in the target time period based on the plurality of normalized network quality detection parameters, the respective pre-defined weights, and a file download success rate for the files in the second node by each node in the target time period within the pre-defined number of historical rate-collecting cycles.

Optionally, creating, by the data processing device, the network fluctuation model from the first node to the second node in the target time period based on the plurality of network quality detection parameters and the respective pre-defined weights includes:

determining, by the data processing device, a maximum regular network speed, a maximum network speed fluctuation range, and a maximum network speed lower limit from the first node to any node in the target time period;

normalizing, by the data processing device, the plurality of network quality detection parameters based on the maximum regular network speed, the maximum network speed fluctuation range, and the maximum network speed lower limit; and creating, by the data processing device, the network fluctuation model from the first node to the second node in the target time period based on the plurality of normalized network quality detection parameters, the respective pre-defined weights, and a file download success rate of the first node for files in each node in the target time period in the pre-defined number of historical rate-collecting cycles.

In another aspect, the present disclosure provides a system for detecting network quality. The system includes a data processing device, a central scheduling device, and a plurality of nodes including a first node and a second node, where:

the data processing device is configured to acquire file download rates of the first node for files on the second node in a target time period within a pre-defined number of historical rate-collecting cycles, determine a plurality of network quality detection parameters from the first node to the second node in the target time period based on the file download rates, where the plurality of network quality detection parameters include a regular network speed, a network speed fluctuation range, and a network speed lower limit, create a network fluctuation model from the first node to the second node in the target time period based on the plurality of network quality detection parameters and respective pre-defined weights, and provide the network fluctuation model to the central scheduling device; and the central scheduling device is configured to detect, according to the network fluctuation model, a network quality from the first node to the second node in the target time period.

Optionally, the central scheduling device is further configured to randomly select at least one device in a device group of each node, and send a pre-defined test file to the at least one device of each node for storage;

at least one device of the second node periodically sends a download trigger request of the test file to at least one device of the first node, to allow the at least one device of the first node to periodically download the test file from the at least one device of the second node; and the data processing device is configured to acquire file download rates of the at least one device of the first node in downloading the test file from the at least one device of the second node in the target time period within the pre-defined number of historical rate-collecting cycles.

Optionally, the data processing device is specifically configured to:

respectively determine a median value, a interquartile range, and a minimum value of all the file download rates of the first node for the files on the second node in the target time period within the pre-defined number of historical rate-collecting cycles as the regular network speed, the network speed fluctuation range, and the network speed lower limit from the first node to the second node in the target time period.

Optionally, the data processing device is specifically configured to:

determine a maximum normal network speed, a maximum network speed fluctuation range, and a maximum network speed lower limit from any node to the second node in the target time period;

normalize the plurality of network quality detection parameters based on the maximum normal network speed, the maximum network speed fluctuation range, and the maximum network speed lower limit; and create the network fluctuation model from the first node to the second node in the target time period based on the plurality of normalized network quality detection parameters, the respective pre-defined weights, and a file download success rate for the files in the second node by each node in the target time period within the pre-defined number of historical rate-collecting cycles.

Optionally, the data processing device is specifically configured to:

determine a maximum regular network speed, a maximum network speed fluctuation range, and a maximum network speed lower limit from the first node to any node in the target time period;

normalize the plurality of network quality detection parameters based on the maximum regular network speed, the maximum network speed fluctuation range, and the maximum network speed lower limit; and create the network fluctuation model from the first node to the second node in the target time period based on the plurality of normalized network quality detection parameters, the respective pre-defined weights, and a file download success rate of the first node for files in each node in the target time period in the pre-defined number of historical rate-collecting cycles.

The beneficial effects brought by the technical solutions provided by the embodiments of the present disclosure are:

In the embodiments of the present disclosure, the data processing device acquires the file download rates of a first node for files on a second node in a target time period within a pre-defined number of historical rate-collecting cycles. The data processing device determines a plurality of network quality detection parameters from the first node to the second node in the target time period based on the file download rates, where the plurality of network quality detection parameters include a regular network speed, a network speed fluctuation range, and a network speed lower limit. The data processing device creates a network fluctuation model from the first node to the second node in the target time period based on the plurality of network quality detection parameters and respective pre-defined weights, and provides the network fluctuation model to the central scheduling device. The central scheduling device detects the network quality from the first node to the second node in the target time period based on the network fluctuation model. In this way, the file download conditions between the nodes may be used to create a network fluctuation model. The network fluctuation model may then be used to detect the network quality between the nodes without necessarily setting up any network detection tool. This may not only reduce the cost in detecting the network quality, but also analyze and measure the network quality in a relatively quantitative manner, thereby providing an intuitive and quantitative data basis for historical analysis, prediction, and scheduling optimization of the network quality.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objective, technical solutions, and advantages of the present disclosure clearer, embodiments of the present disclosure will be made in detail hereinafter with reference to the accompanying drawings.

Figure 1:
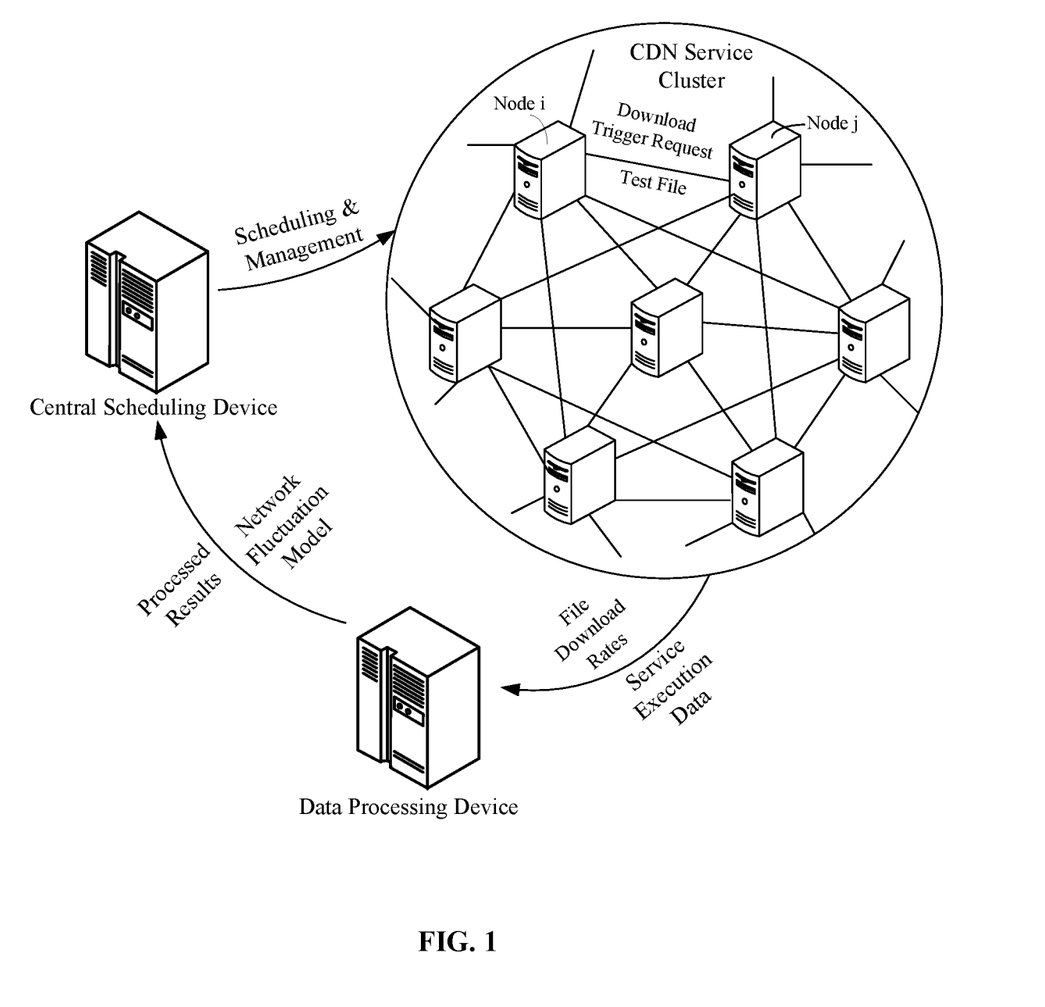
FIG. 1 is a schematic diagram of a network architecture for detecting network quality according to some embodiments of the present disclosure.

The embodiments of the present disclosure provide a method for detecting network quality. The method may be implemented by a combination of a data processing device and a central scheduling device in a CDN service cluster, along with the nodes in the CDN service cluster. A specific network architecture to implement the method is shown in FIG. 1. In the architecture, the data processing device may be configured to collect service execution data between the nodes in the CDN service cluster, and process (e.g., analyze, organize) the collected service execution data. Based on the results processed from the service execution data by the data processing device, the central scheduling device may uniformly schedule and manage the CDN service cluster. The above network device may include a processor, a memory, and a transceiver. The processor may be configured to implement the network quality detection process in the following process. The memory may be configured to store the data required and generated in the following process. The transceiver may be configured to receive and transmit relevant data in the following process. It should be understood that the functionalities implemented by the data processing device and the central scheduling device may be also implemented by multiple components located within the same network device. The data processing device and the central scheduling device will be described as independent network devices in the disclosed embodiments. The network architecture with other configurations will be implemented similarly, details of which will not be repeated.

Figure 2:
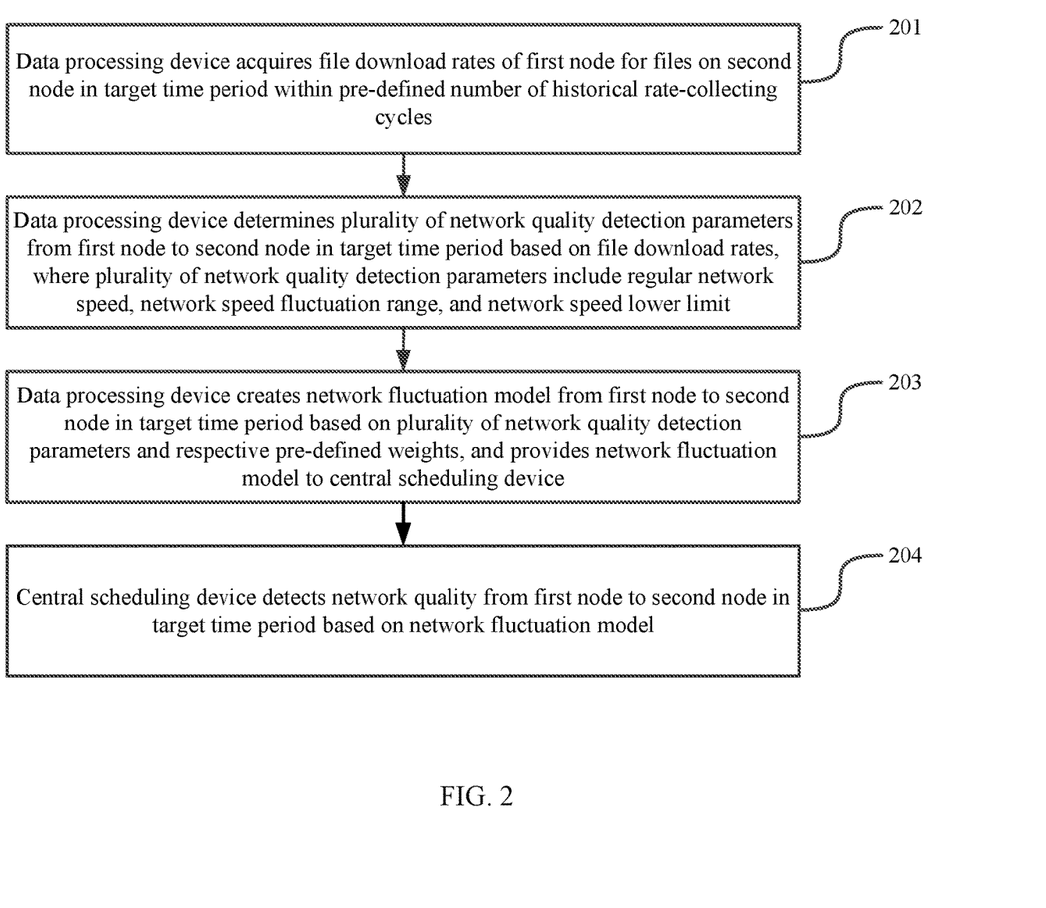
FIG. 2 is a flowchart of a method for detecting network quality according to some embodiments of the present disclosure.

The processing flow shown in FIG. 2 will be made in detail hereinafter in conjunction with specific implementations. The content may be as follows.

Step 201: the data processing device acquires file download rates of a first node for files on a second node in a target time period within a pre-defined number of historical rate-collecting cycles.

A rate-collecting cycle may be manually defined. A cycle for collecting file download rates may be one day. Each rate-collecting cycle may be divided into multiple time periods, and each time period may be one hour. The first node and the second node may be any node in the CDN service cluster.

In one implementation, the data processing device may monitor the file transmission states between each node in the CDN service cluster in real time. If one node has downloaded a file from another node, the data processing device may calculate a corresponding file download rate. The file download rate r may equal to the file size divided by the time for downloading the file. When there is a need to detect the network quality between the nodes in the CDN service cluster in a specified target time period, the data processing device may acquire, within a pre-defined number of historical rate-collecting cycles, file download rates of each node in downloading files from other nodes in the target time period. The following description will take the example of the rate-collecting cycle as one day and the target time period as one hour. The description for other situations will be similar to the description for this example. Taking a first node (which may be called an i-node) and a second node (which may be called a j-node) as an example, when there is a need to detect the network quality between the two nodes in the h-th hour, the data processing device acquires the file download rates of the i-node for the files on the j-node in the h-th hour within a pre-defined number of days (e.g., k days).

Optionally, a specific test file is set on each node, and the data processing device may acquire the file download rates only for the test file on each node. Correspondingly, the process of Step 201 may be as follows: the central scheduling device randomly selects at least one device from a device group in each node, and sends a pre-defined test file to the at least one device of each node for storage; at least one device of the second node periodically sends a download trigger request for the test file to at least one device of the first node, to allow the at least one device of the first node to periodically download the test file from the at least one device of the second node; the data processing device acquires the file download rates of the at least one device of the first node in downloading the test file from the at least one device of the second node in the target time period within a pre-defined number of historical rate-collecting cycles.

In one implementation, each node in the CDN service cluster may be a device group comprising multiple devices. The central scheduling device may randomly select at least one device from a device group of each node, and then send the pre-defined test file to the at least one device of each node. Therefore, each node may include an equal number of devices storing the pre-defined test file. The file size of the test file may be about 2M, which may prevent the node performance from being impacted by a too large size of the test file when the test file is downloaded, or avoid the file download rate being inaccurate because the file is too small. Thereafter, each device that stores the test file may periodically send a download trigger request for the test file to each of the selected devices of the other nodes, so that these devices may periodically download the test file from the device. Taking the i-node and the j-node as an example, a device selected at the j-node may periodically send (for example, every 10 minutes) a download trigger request of the test file to all selected devices at the i-node, so that the selected devices in the i-node may periodically download the test file from the selected device at the j-node. In this way, when there is a need to detect the network quality from the i-node to the j-node in the h-th hour, the data processing device may acquire the file download rates of the selected devices in the i-node in downloading the test file from the selected device in the j-node in the h-th hour within k days.

Step 202: the data processing device determines, based on the file download rates, a plurality of network quality detection parameters from the first node to the second node in the target time period.

The plurality of network quality detection parameters include a regular network speed, a network speed fluctuation range, and a network speed lower limit.

In one implementation, after acquiring the file download rates of the i-node for the files on the j node in the h-th hour within k days, the data processing device may determine, based on the file download rates, a regular network speed $x_{(h,i,j)}$, a network speed fluctuation range $y_{(h,i,j)}$, and a network speed lower limit $z_{(h,i,j)}$ from the i node to the j node in the h-th hour of each cycle. Here, the regular network speed $x_{(h,i,j)}$ is the network speed when the network between the two nodes is normal; the network speed fluctuation range $y_{(h,i,j)}$ reflects the network stability between the two nodes; and the network speed lower limit $z_{(h,i,j)}$ is the network speed when the network quality between the two nodes is extremely poor.

Optionally, the process for determining the network quality detection parameters may be specifically as follows: the data processing device respectively determines a median value, an interquartile range, and a minimum value of all the file download rates of the first node for the files on the second node in the target time period within the pre-defined number of historical rate-collecting cycles as the regular network speed, the network speed fluctuation range, and the network speed lower limit from the first node to the second node in the target time period.

In one implementation, after acquiring the file download rates of the i node for the files on the j node in the h-th hour within k days, the data processing device may summarize and sort all the file download rates, and then respectively determine the median value, the interquartile range, and the minimum value of all the filed download rates as the regular network speed $x_{(h,i,j)}$, the network speed fluctuation range $y_{(h,i,j)}$, and the network speed lower limit $z_{(h,i,j)}$ from the first node to the second node in the target time period. Specifically, $r_{(n,h,i,j)}$ means the file download rate of the i node for the files on the j node at the h-th hour of the n-th day. With k days' data being processed, there is:

$$\begin{cases} x_{(h,i,j)} = \underset{n}{median}(r_{(n,h,i,j)}) \\ y_{(h,i,j)} = \text{`IQR\_r}_{(h,i,j)} = Q_3 - Q_1 = \underset{n}{quartile}_{0.75}(r_{(n,h,i,j)}) - \underset{n}{quartile}_{0.25}(r_{(n,h,i,j)}) \\ z_{(h,i,j)} = \underset{n}{min}(r_{(n,h,i,j)}) \end{cases}$$

where, $h = (0, 1, \ldots, 23)$, $n = (N - k + 1, N - k + 2, \ldots, N)$.

Step 203: the data processing device creates a network fluctuation model from the first node to the second node in the target time period according to the plurality of network quality detection parameters and respective pre-defined weights, and provides the network fluctuation model to the central scheduling device.

In one implementation, technical staff may set respective pre-defined weights for the plurality of network quality detection parameters based on the network quality evaluation criteria of the CDN service cluster. A sum of all the pre-defined weights may be a fixed value. For example, if the network quality evaluation criteria include that the higher the network speed in a normal situation the better, the network may have certain fluctuations, and there is no need to consider the network speed when the network is extremely poor, then the pre-defined weight a for the regular network speed $x_{(h,i,j)}$ is relatively high, the pre-defined weight b for the network speed fluctuation range $y_{(h,i,j)}$ is relatively low, and the pre-defined weight c for the network speed lower limit $z_{(h,i,j)}$ is extremely low. In this way, after determining the plurality of network quality detection parameters from the i node to the j node in the h-th hour of each cycle, based on the plurality of network quality detection parameters and the respective pre-defined weights, the data processing device may create a network fluctuation model $f(h,i,j)=g(ax,by,cz)$ from the i node to the j node in the h-th hour. The data processing device may then provide the network fluctuation model $f(h,i,j)=g(ax,by,cz)$ to the central scheduling device.

Optionally, the plurality of network quality detection parameters may be normalized with respect to i dimension, and then the network fluctuation model is created. Correspondingly, the process of Step 203 may be specifically as follows: the data processing device determines a maximum regular network speed, a maximum network speed fluctuation range, and a maximum network speed lower limit from any node to the second node in the target time period; the data processing device normalizes the plurality of network quality detection parameters based on the maximum regular network speed, the maximum network speed fluctuation range, and the maximum network speed lower limit; the data processing device creates the network fluctuation model from the first node to the second node in the target time period based on the plurality of normalized network quality detection parameters and the respective pre-defined weights, as well as a file download success rate for the files on the second node by all the nodes in the target time period within the pre-defined number of historical rate-collecting cycles.

In one implementation, the data processing device may first acquire the file download rates of any node(s) for the files on the j node in the h-th hour within k days, next determine the regular network speed, the network speed fluctuation range, and the network speed lower limit from each node to the j node in the target time period based on the processing of Step 202. The data processing device may then determine the maximum regular network speed $$\max_i(x_{(h,i,j)}),$$

the maximum network speed fluctuation range $$\max_i(y_{(h,i,j)}),$$

and the maximum network speed lower limit $$\max_i(z_{(h,i,j)})$$

from all the regular network speeds, network speed fluctuation ranges, and network speed lower limits. Further, the data processing device may normalize the plurality of network quality detection parameters from the i-node to the j-node in the h-th time period based on the maximum regular network speed, the maximum network speed fluctuation range, and the maximum network speed lower limit:

$$\begin{cases} X_{(h,i,j)} = \dfrac{x_{(h,i,j)}}{\max_i(x_{(h,i,j)})} \\ Y_{(h,i,j)} = \dfrac{y_{(h,i,j)}}{\max_i(y_{(h,i,j)})} \\ Z_{(h,i,j)} = \dfrac{z_{(h,i,j)}}{\max_i(z_{(h,i,j)})} \end{cases}$$

At the same time, the data processing device may also determine the file download success rate of all the node for the files on the j node in the h-th time period within k days: $s_{(h,j)}$=(total number of downloads−number of failed downloads)/total number of downloads. Thereafter, based on the plurality of normalized network quality detection parameters $X_{(h,i,j)}$, $Y_{(h,i,j)}$, $Z_{(h,i,j)}$ and the respective pre-defined weights a, b, c, as well as the above file download success rate, the data processing device may create the network fluctuation model from the i node to the j node in the h-th time period:

$$\begin{cases} f(h, i, j) = s_{(h,j)} * [a * X_{(h,i,j)} + b * (1 - Y_{(h,i,j)}) + c * Z_{(h,i,j)}] \\ a + b + c = 1 \end{cases}$$

Optionally, the plurality of network quality detection parameters may be normalized with respect to j dimension, and then the network fluctuation model is created. Correspondingly, the process of Step 203 may be specifically as follows: the data processing device determines a maximum regular network speed, a maximum network speed fluctuation range, and a maximum network speed lower limit from the first node to any node in the target time period; the data processing device normalizes the plurality of network quality detection parameters based on the maximum regular network speed, the maximum network speed fluctuation range, and the maximum network speed lower limit; the data processing device creates the network fluctuation model from the first node to the second node in the target time period based on a plurality of normalized network quality detection parameters and the respective pre-defined weights, as well as the file download success rate of the first node for the files on all the nodes in the target time period within the pre-defined number of historical rate-collecting cycles.

It should be noted that the above two network fluctuation models created based on the different i-dimension and j-dimension normalization processes may both be used to detect the network quality from the first node to the second node, and the specific application scenarios may be different. Specifically, for the normalization process based on the i dimension, the network quality for the files on the j node to overlay other nodes may be determined; for the normalization process based on the j dimension, the network quality for the i node to download files from the other nodes may be determined. Accordingly, when a node needs to download a file, the network fluctuation model created based on the i-dimension normalization process may be used to detect the network quality between the nodes, to determine from which node to download the file. However, when there is a need to set a service range for a node, the network fluctuation model created based on the j-dimension normalization process is used to detect the network quality between the nodes, to determine to which nodes the node may provide the file download service.

Step 204: the central scheduling device detects a network quality from the first node to the second node in the target time period based on the network fluctuation model.

In one implementation, after receiving the network fluctuation model f(h,i,j)=g(ax,by,cz) provided by the data processing device, the central scheduling device detects the network quality from the first node to the second node in the h-th hour based on the network fluctuation model f(h,i,j)=g(ax,by,cz).

It is to be understood that, based on the process of the foregoing Steps 201-204, the network quality detection process may be implemented between any two nodes of the CDN service cluster in any time period. After repeatedly implementing the process of Steps 201-204, the network quality between all nodes in the CDN service cluster in all time periods may be effectively detected.

Optionally, the central scheduling device may also perform multiple applications based on the network fluctuation models between the nodes, which may be specifically as follows:

Application 1: with respect to a third node and a fourth node, if a network fluctuation model from the third node to any other node at any time is similar to a network fluctuation model from the fourth node to the corresponding node, the quality of network service provided by the third node and the quality of network service provided by the fourth node are essentially the same. Accordingly, the central scheduling device may further detect the service cost for the third node and the fourth node, and select a node with the lower service cost, or use the node with the lower service cost as a standard to configure the node with the higher service cost, to reduce the total service cost of the CDN service cluster.

Application 2: for any node, the central scheduling device may determine the network quality from other nodes to the node in each time period of a rate-collecting cycle based on the network fluctuation models between the nodes, and then adjust the service range of the node in each time period in a targeted manner, that is, determine to which node to provide the file download service at each time period.

Application 3: for any node, the central scheduling device may determine the network quality from the node to other nodes in each time period in a rate-collecting cycle based on the network fluctuation models between the nodes, and then adjust the file download range of the node in each time period in a targeted manner, that is, determine from which node to download files at each time period.

Application 4, the nodes may be classified according to pre-defined criteria, for example, according to region, or according to network operator, etc. Through the network fluctuation models between the nodes, the network quality for the nodes between each classification may then be determined as a whole. For example, the network quality may be detected for the nodes between the regions, or between different network operators.

Application 5: for any two nodes, the network state between the two nodes in a preceding time period of the current rate-collecting cycle (i.e., the f(h,i,j) value) and the network states between the two nodes in the current time period in a plurality of historical rate-collecting cycles may be combined to predict the network state between the two nodes at the current moment of the current cycle.

In the embodiments of the present disclosure, the data processing device acquires the file download rates of a first node for files on a second node in a target time period within a pre-defined number of historical rate-collecting cycles.

The data processing device determines a plurality of network quality detection parameters from the first node to the second node in the target time period based on the file download rates, where the plurality of network quality detection parameters include a regular network speed, a network speed fluctuation range, and a network speed lower limit. The data processing device creates a network fluctuation model from the first node to the second node in the target time period based on the plurality of network quality detection parameters and respective pre-defined weights, and provides the network fluctuation model to the central scheduling device. The central scheduling device detects the network quality from the first node to the second node in the target time period based on the network fluctuation model. In this way, the file download conditions between the nodes may be used to create a network fluctuation model. The network fluctuation model may then be used to detect the network quality between the nodes without necessarily setting up any network detection tool. This may not only reduce the cost in detecting the network quality, but also analyze and measure the network quality in a relatively quantitative manner, thereby providing an intuitive and quantitative data basis for historical analysis, prediction, and scheduling optimization of the network quality.

Based on similar technical concepts, the embodiments of the present disclosure further provide a system for detecting network quality. The system includes a data processing device, a central scheduling device, and a plurality of nodes including a first node and a second node, where:

the data processing device is configured to acquire file download rates of the first node for files on the second node in a target time period within a pre-defined number of historical rate-collecting cycles, determine a plurality of network quality detection parameters from the first node to the second node in the target time period based on the file download rates, where the plurality of network quality detection parameters include a regular network speed, a network speed fluctuation range, and a network speed lower limit, create a network fluctuation model from the first node to the second node in the target time period based on the plurality of network quality detection parameters and respective pre-defined weights, and provide the network fluctuation model to the central scheduling device; and the central scheduling device is configured to detect, according to the network fluctuation model, a network quality from the first node to the second node in the target time period.

Optionally, the central scheduling device is further configured to randomly select at least one device in a device group of each node, and send a pre-defined test file to the at least one device of each node for storage;

at least one device of the second node periodically sends a download trigger request of the test file to at least one device of the first node, to allow the at least one device of the first node to periodically download the test file from the at least one device of the second node; and the data processing device is configured to acquire file download rates of the at least one device of the first node in downloading the test file from the at least one device of the second node in the target time period within the pre-defined number of historical rate-collecting cycles.

Optionally, the data processing device is specifically configured to:

respectively determine a median value, a interquartile range, and a minimum value of all the file download rates of the first node for the files on the second node in the target time period within the pre-defined number of historical rate-collecting cycles as the regular network speed, the network speed fluctuation range, and the network speed lower limit from the first node to the second node in the target time period.

Optionally, the data processing device is specifically configured to:

determine a maximum normal network speed, a maximum network speed fluctuation range, and a maximum network speed lower limit from any node to the second node in the target time period;

normalize the plurality of network quality detection parameters based on the maximum normal network speed, the maximum network speed fluctuation range, and the maximum network speed lower limit; and create the network fluctuation model from the first node to the second node in the target time period based on the plurality of normalized network quality detection parameters, the respective pre-defined weights, and a file download success rate for the files in the second node by each node in the target time period within the pre-defined number of historical rate-collecting cycles.

Optionally, the data processing device is specifically configured to:

determine a maximum regular network speed, a maximum network speed fluctuation range, and a maximum network speed lower limit from the first node to any node in the target time period;

normalize the plurality of network quality detection parameters based on the maximum regular network speed, the maximum network speed fluctuation range, and the maximum network speed lower limit; and create the network fluctuation model from the first node to the second node in the target time period based on the plurality of normalized network quality detection parameters, the respective pre-defined weights, and a file download success rate of the first node for files in each node in the target time period in the pre-defined number of historical rate-collecting cycles.

In the embodiments of the present disclosure, the data processing device acquires the file download rates of a first node for files on a second node in a target time period within a pre-defined number of historical rate-collecting cycles. The data processing device determines a plurality of network quality detection parameters from the first node to the second node in the target time period based on the file download rates, where the plurality of network quality detection parameters include a regular network speed, a network speed fluctuation range, and a network speed lower limit. The data processing device creates a network fluctuation model from the first node to the second node in the target time period based on the plurality of network quality detection parameters and respective pre-defined weights, and provides the network fluctuation model to the central scheduling device. The central scheduling device detects the network quality from the first node to the second node in the target time period based on the network fluctuation model. In this way, the file download conditions between the nodes may be used to create a network fluctuation model. The network fluctuation model may then be used to detect the network quality between the nodes without necessarily setting up any network detection tool. This may not only reduce the cost in detecting the network quality, but also analyze and measure the network quality in a relatively quantitative manner, thereby providing an intuitive and quantitative data basis for historical analysis, prediction, and scheduling optimization of the network quality.

A person skilled in the art may understand that all or part of the steps of the above embodiments may take the form of hardware implementation or the form of implementation of programs for instructing relevant hardware. The programs may be stored in a computer-readable storage medium. The storage medium may be a read-only memory, a magnetic disk, or an optical disk, etc.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. A method for detecting network quality, comprising:
    acquiring, by a data processing device, file download rates of a first node for files on a second node in a target time period within a pre-defined number of historical rate-collecting cycles;
    determining, by the data processing device, a plurality of network quality detection parameters from the first node to the second node in the target time period based on the file download rates, wherein the plurality of network quality detection parameters include a regular network speed, a network speed fluctuation range, and a network speed lower limit;
    creating, by the data processing device, a network fluctuation model from the first node to the second node in the target time period based on the plurality of network quality detection parameters and respective pre-defined weights, and providing the network fluctuation model to a central scheduling device; and
    detecting, by the central scheduling device, a network quality from the first node to the second node in the target time period based on the network fluctuation model.

2. The method according to claim 1, wherein acquiring, by the data processing device, the file download rates of the first node for the files on the second node in the target time period within the pre-defined number of historical rate-collecting cycles further includes:
    randomly selecting, by the central scheduling device, at least one device in a device group of each node, and sending a pre-defined test file to the at least one device of each node for storage;
    periodically sending, by at least one device of the second node, a download trigger request of the test file to at least one device of the first node, to allow the at least one device of the first node to periodically download the test file from the at least one device of the second node; and
    acquiring, by the data processing device, file download rates of the at least one device of the first node in downloading the test file from the at least one device of the second node in the target time period within the pre-defined number of historical rate-collecting cycles.

3. The method according to claim 1, wherein determining, by the data processing device, the plurality of network quality detection parameters from the first node to the second node in the target time period based on the file download rates further includes:
    respectively determining, by the data processing device, a median value, a interquartile range, and a minimum value of all the file download rates of the first node for the files on the second node in the target time period within the pre-defined number of historical rate-collecting cycles as the regular network speed, the network speed fluctuation range, and the network speed lower limit from the first node to the second node in the target time period.

4. The method according to claim 3, wherein creating, by the data processing device, the network fluctuation model from the first node to the second node in the target time period based on the plurality of network quality detection parameters and the respective pre-defined weights further includes:
    determining, by the data processing device, a maximum normal network speed, a maximum network speed fluctuation range, and a maximum network speed lower limit from any node to the second node in the target time period;
    normalizing, by the data processing device, the plurality of network quality detection parameters based on the maximum normal network speed, the maximum network speed fluctuation range, and the maximum network speed lower limit; and
    creating, by the data processing device, the network fluctuation model from the first node to the second node in the target time period based on the plurality of normalized network quality detection parameters, the respective pre-defined weights, and a file download success rate for the files in the second node by each node in the target time period within the pre-defined number of historical rate-collecting cycles.

5. The method according to claim 3, wherein creating, by the data processing device, the network fluctuation model from the first node to the second node in the target time period based on the plurality of network quality detection parameters and the respective pre-defined weights further includes:
    determining, by the data processing device, a maximum regular network speed, a maximum network speed fluctuation range, and a maximum network speed lower limit from the first node to any node in the target time period;
    normalizing, by the data processing device, the plurality of network quality detection parameters based on the maximum regular network speed, the maximum network speed fluctuation range, and the maximum network speed lower limit; and
    creating, by the data processing device, the network fluctuation model from the first node to the second node in the target time period based on the plurality of normalized network quality detection parameters, the respective pre-defined weights, and a file download success rate of the first node for files in each node in the target time period in the pre-defined number of historical rate-collecting cycles.

6. A system for detecting network quality, comprising a data processing device, a central scheduling device, and a plurality of nodes including a first node and a second node, wherein:
    the data processing device is configured to acquire file download rates of the first node for files on the second node in a target time period within a pre-defined number of historical rate-collecting cycles, determine a plurality of network quality detection parameters from the first node to the second node in the target time period based on the file download rates, wherein the plurality of network quality detection parameters include a regular network speed, a network speed fluctuation range, and a network speed lower limit, create a network fluctuation model from the first node to the second node in the target time period based on the plurality of network quality detection parameters and respective pre-defined weights, and provide the network fluctuation model to the central scheduling device; and the central scheduling device is configured to detect, according to the network fluctuation model, a network quality from the first node to the second node in the target time period.

7. The system according to claim 6, wherein:

the central scheduling device is further configured to randomly select at least one device in a device group of each node, and send a pre-defined test file to the at least one device of each node for storage;

at least one device of the second node periodically sends a download trigger request of the test file to at least one device of the first node, to allow the at least one device of the first node to periodically download the test file from the at least one device of the second node; and the data processing device is further configured to acquire file download rates of the at least one device of the first node in downloading the test file from the at least one device of the second node in the target time period within the pre-defined number of historical rate-collecting cycles.

8. The system according to claim 6, wherein the data processing device is further configured to:

respectively determine a median value, a interquartile range, and a minimum value of all the file download rates of the first node for the files on the second node in the target time period within the pre-defined number of historical rate-collecting cycles as the regular network speed, the network speed fluctuation range, and the network speed lower limit from the first node to the second node in the target time period.

9. The system according to claim 8, wherein the data processing device is further configured to:

determine a maximum normal network speed, a maximum network speed fluctuation range, and a maximum network speed lower limit from any node to the second node in the target time period;

normalize the plurality of network quality detection parameters based on the maximum normal network speed, the maximum network speed fluctuation range, and the maximum network speed lower limit; and create the network fluctuation model from the first node to the second node in the target time period based on the plurality of normalized network quality detection parameters, the respective pre-defined weights, and a file download success rate for the files in the second node by each node in the target time period within the pre-defined number of historical rate-collecting cycles.

10. The system according to claim 8, wherein the data processing device is further configured to:

determine a maximum regular network speed, a maximum network speed fluctuation range, and a maximum network speed lower limit from the first node to any node in the target time period;

normalize the plurality of network quality detection parameters based on the maximum regular network speed, the maximum network speed fluctuation range, and the maximum network speed lower limit; and create the network fluctuation model from the first node to the second node in the target time period based on the plurality of normalized network quality detection parameters, the respective pre-defined weights, and a file download success rate of the first node for files in each node in the target time period in the pre-defined number of historical rate-collecting cycles.

* * * * *